March 6, 1934.  B. WHITE ET AL  1,949,821
SIGNAL BOX
Filed April 17, 1931  2 Sheets-Sheet 1
Fig. 1.
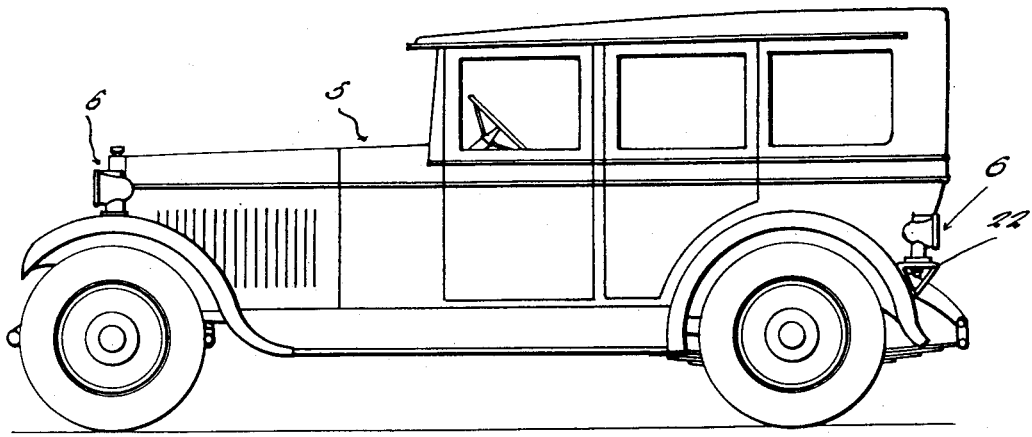
Fig. 2.  Fig. 3.
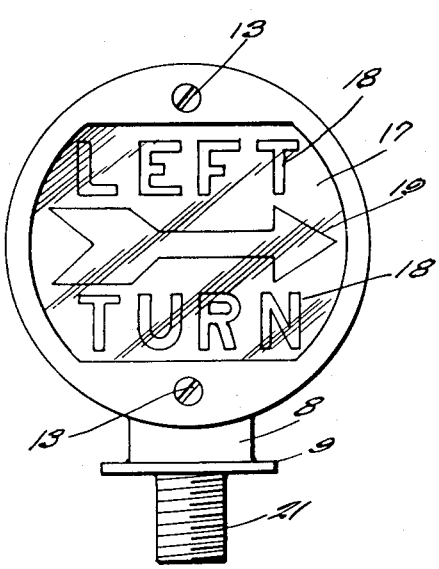 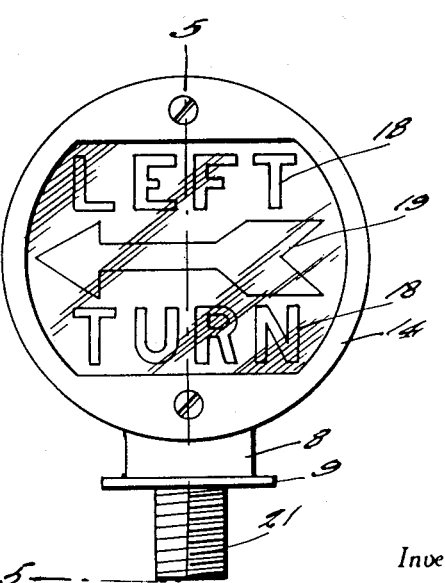
Inventor
Benjamin White
Claude C. Evans
By Clarence A. O'Brien
Attorney March 6, 1934. B. WHITE ET AL 1,949,821
SIGNAL BOX
Filed April 17, 1931 2 Sheets-Sheet 2
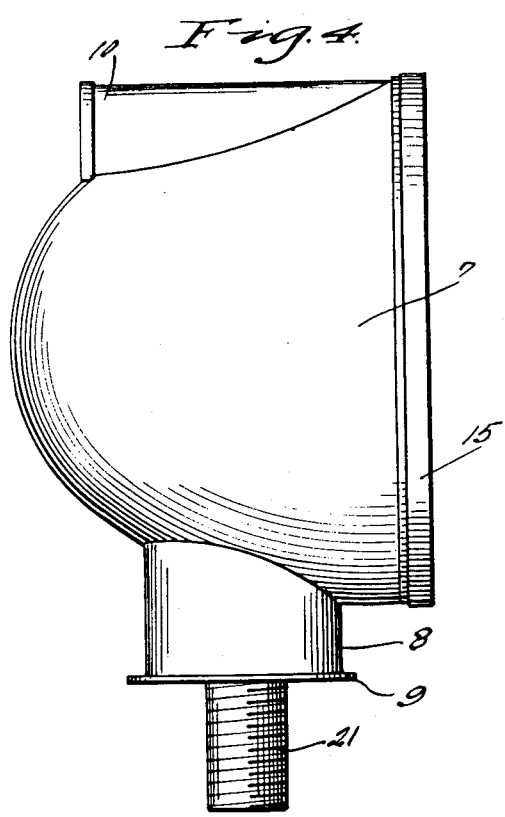
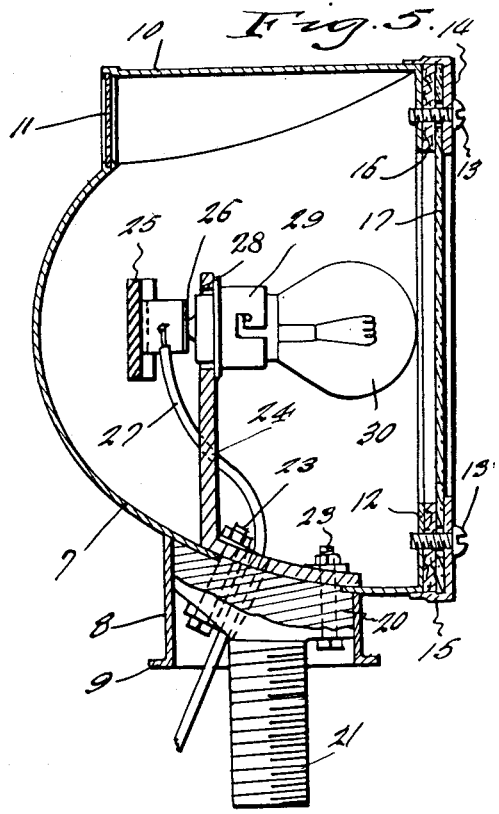
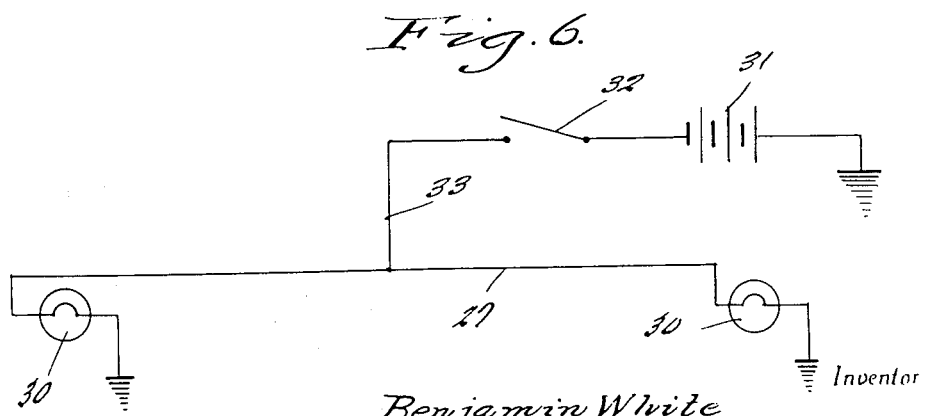
Inventor
Benjamin White
Claude C Evans
By Clarence A O'Brien
Attorney Patented Mar. 6, 1934

1,949,821

UNITED STATES PATENT OFFICE 1,949,821

SIGNAL BOX

Benjamin White and Claude C. Evans,
Austin, Tex.

Application April 17, 1931, Serial No. 530,954

1 Claim. (Cl. 177—329)

This invention relates to new and useful improvements in electrical signaling, and more particularly to a novel signal box for use on automobiles and like vehicles, the principal object of this invention being to provide a signal box which can be readily mounted on an automobile and wherein the construction is such as to permit quick repair and replacement of parts.

During the course of the following specification and claim, other important objects and advantages of the invention will become apparent to the reader.

In the drawings:—

Figure 1 represents a side elevational view of an automobile, equipped with the present invention.

Fig. 2 represents a front elevational view of the front signal box.

Fig. 3 represents a front elevational view of the rear signal box.

Fig. 4 represents a side elevational view of the signal box.

Fig. 5 represents a vertical sectional view through the signal box taken substantially on the line 5—5 of Fig. 3.

Fig. 6 represents a diagrammatic view disclosing the electrical connections between the electrical devices involved.

Referring to the drawings wherein like numerals designate like parts, it can be seen in Fig. 1 that numeral 5 generally refers to an automobile, and on the rear left fender, as well as on the front left fender is one of the novel signal boxes generally referred to by numeral 6. These signal boxes are constructed identically, excepting that the arrow on the lens is reversed on the front signal box from that on the rear signal box, as clearly shown in Figs. 2 and 3.

Each of these signal boxes consists of a substantially parabolic formation, having a depending tubular skirt 8 flanged at its lower end as at 9. The upper portion of the casing is disposed upwardly to provide the dome 10 which is open at one end to receive the rear lens 11.

The forward side of the casing is provided with a circumferentially extending and inwardly disposed flange 12. This flange is provided with a threaded opening at its upper and lower portion to receive a corresponding screw 13. A rim 14 is flanged laterally at its periphery as at 15, and this flange is disposed over the outside of the casing 7 adjacent the flange 12.

A felt gasket 16 is disposed against the outer side of the flange 12, and interposed between the gasket 16 and the rim 14 is the lens 17. The lens 17 and the flange 12 are provided with openings registering with like openings and the gasket 16 and rim 14 for receiving the aforementioned screws 13. In this manner, the screws 13 serve to maintain the rim 14, lens 17 and gasket 16 intact against the flange 12. The lens 17 has suitable directional words 18 thereon and a directional symbol 19. A block 20 is disposed into the skirt 8 and has a threaded shank 21 extending therefrom for disposition through an opening in a suitable bracket 22, secured to the fender of the automobile in the manner shown in Fig. 1.

Bolts 23 extend through the blocks 20 and through the lower portion of the casing 7 to secure the lower portion of the L-shaped bracket 24 to the casing 7. A cross member 25 is mounted within the casing and on this is the contact 26 suitably insulated from the casing by the bar 25, which is preferably of some suitable insulating material.

Numeral 27 represents the current supply conductor to the contact. The upper portion of the bracket 24 has an opening 28 therein for receiving the sockets 29 in which the bulb 30 engages, and this bulb engages the contacts in the manner substantially shown in Fig. 5.

By referring to Fig. 6, it can be seen that numeral 31 represents the battery, one side of which is grounded, and the other side of which connects to the switch 32. The other side of the switch 32 connects to the wire 27 between the contacts 26—26 of the signal boxes by way of the wire 33.

While the foregoing specification sets forth the invention in specific terms, it is to be understood that numerous changes in the shape, size, and materials may be resorted to without departing from the spirit and scope of the invention as claimed hereinafter.

Having thus described our invention, what we claim as new is:—

A lamp box comprising a casing having a windowed side, a block provided with a threaded shank, said block being disposed against the bottom of the casing, an L-shaped bracket in the casing, a lamp socket supported by the bracket, a securing element disposed through the block, casing and lower portion of the bracket for securing these elements rigidly together, and a tubular skirt-like shell depending from the casing and surrounding the said block, said casing being provided with an opening and a prominence on the block projecting through the opening to abut the bracket, said block and lower portion of the bracket being of such extent as to overlap the edge portion of the casing at the said opening therein.

BENJAMIN WHITE.
CLAUDE C. EVANS.